G. M. FURMAN.
SULKY HARROW.
No. 191,043. Patented May 22, 1877.
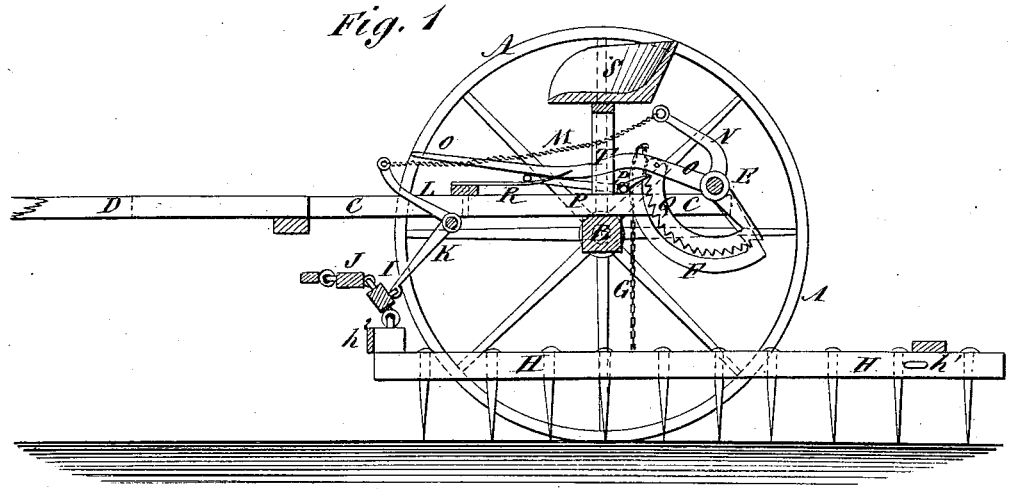
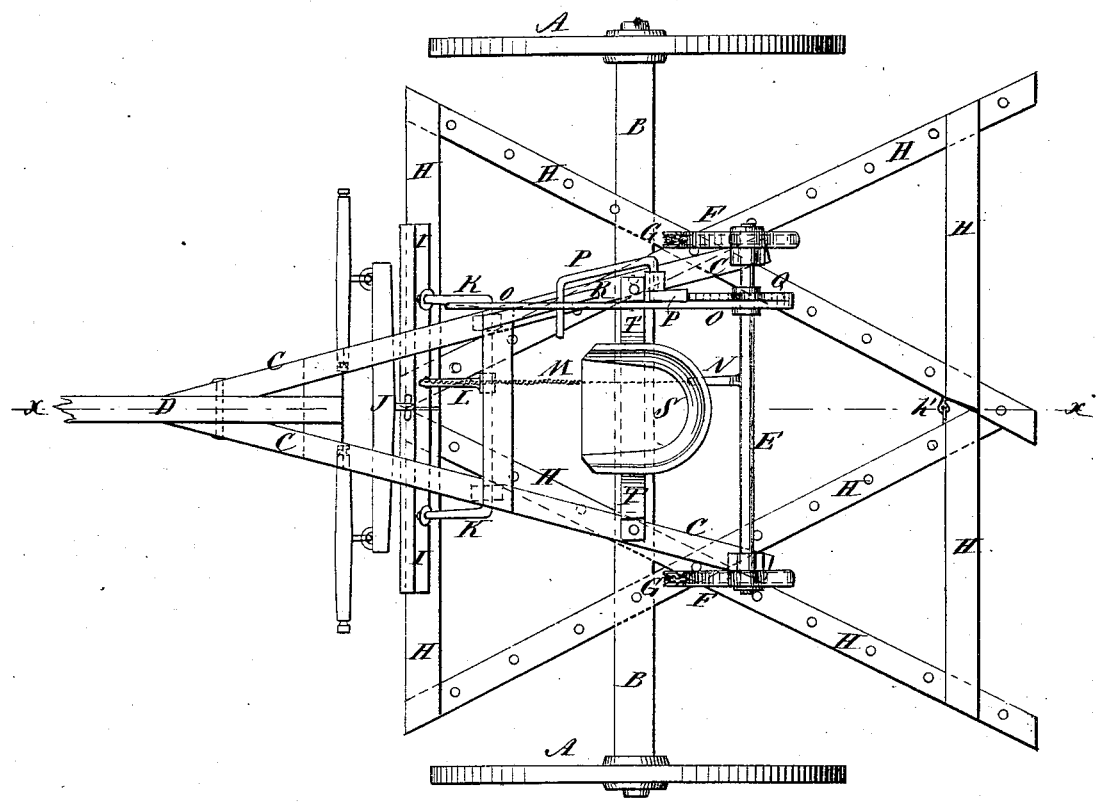
WITNESSES:
C. Neveux
J. H. Scarborough
INVENTOR:
G. M. Furman
BY
ATTORNEYS.

UNITED STATES PATENT OFFICE.

GEORGE M. FURMAN, OF LACLEDE, MISSOURI.

IMPROVEMENT IN SULKY-HARROWS.

Specification forming part of Letters Patent No. 191,043, dated May 22, 1877; application filed March 19, 1877.

*To all whom it may concern:*

Be it known that I, GEORGE M. FURMAN, of Laclede, in the county of Linn and State of Missouri, have invented a new and useful Improvement in Sulky - Harrow, of which the following is a specification:

Figure 1 is a vertical longitudinal section of my improved harrow, taken through the line $x\ x$, Fig. 2. Fig. 2 is a top view of the same.

Similar letters of reference indicate corresponding parts.

The object of this invention is to furnish an improved riding-harrow which shall be so constructed that it may be readily raised from the ground, by the driver from his seat, to clear it of rubbish, to pass obstructions, and to pass from place to place, which shall be simple in construction, convenient in use, and effective in operation, cutting up the ground, and covering the seed thoroughly, and which may be used for cultivating small grain and plants.

The invention will first be described in connection with the drawing, and then pointed out in the claim.

A are the wheels, which revolve upon the journals of the axle B. To the axle B are attached the hounds C, to the forward ends of which the tongue D is attached, and the rear ends of which project a little in the rear of the axle B, and to the said projecting ends are attached bearings for the rock-shaft E.

To the ends of the rock-shaft are attached semicircular arms or segments F, to the ends of which are attached the upper ends of two chains, G, the lower ends of which are attached to the centers of the two parts H of the harrow-frame. Each part of the harrow-frame is made in the form of the letter X, with cross-bars at its forward and rear ends.

The two parts H of the harrow-frame are connected together by an eyebolt-hinge, $h^1$, or other suitable flexible connection. The forward ends of the two parts H of the harrow-frame are connected by a plate, $h^2$, secured to the forward side of the adjacent ends of the forward cross-bars by four bolts, which form a rigid connection, and which by removing two of said bolts becomes a flexible or hinge connection.

To the forward cross-bars of the frame H is secured, by an eyebolt-hinge, or other suitable hinge, a draw-bar, I, to the center of which is attached the double-tree J.

To the draw-bar I, near its ends, are hinged the ends of a U-bar, K, the middle part of which works in bearings attached to the hounds C, and to which middle part is rigidly attached a forwardly-projecting arm, L. To the end of the arm L is attached the forward end of the chain M, the rear end of which is attached to an arm, N, rigidly attached to the rock-shaft E, so that the double-tree and draw-bar may be raised by the same movement of the shaft E that raises the harrow-frame H, and so that by adjusting the length of the chain M the draw-bar I and double-tree J may be adjusted higher or lower, as required.

The shaft E is operated to raise and lower the harrow-frame by a lever, O, rigidly attached to it, and is held in any position into which it may be adjusted by a lever-pawl, P, which engages with the teeth of a semircular ratchet-bar, Q, attached to the shaft E.

The engaging end of the pawl P is held against the ratchet-bar Q by a spring, R, attached to the hounds C. The free end of the pawl P projects into such a position that it may be conveniently operated by the driver, with his foot, to allow the harrow to be lowered.

S is the driver's seat, the supports T of which are attached to the hounds C directly over the axle.

Having thus described my invention, I claim as new and desire to secure by Letters Patent—

A harrow-frame, consisting of the two X-frames H H, rear-hinged at $h^1$ and bolted at the front through plate $h^2$, as shown and described.

GEORGE M. FURMAN.

Witnesses:
AMBROSS A. FURMAN,
ROBERT A. KAY.